(No Model.)
E. BATLLE.
VEHICLE WHEEL.
No. 411,489. Patented Sept. 24, 1889.
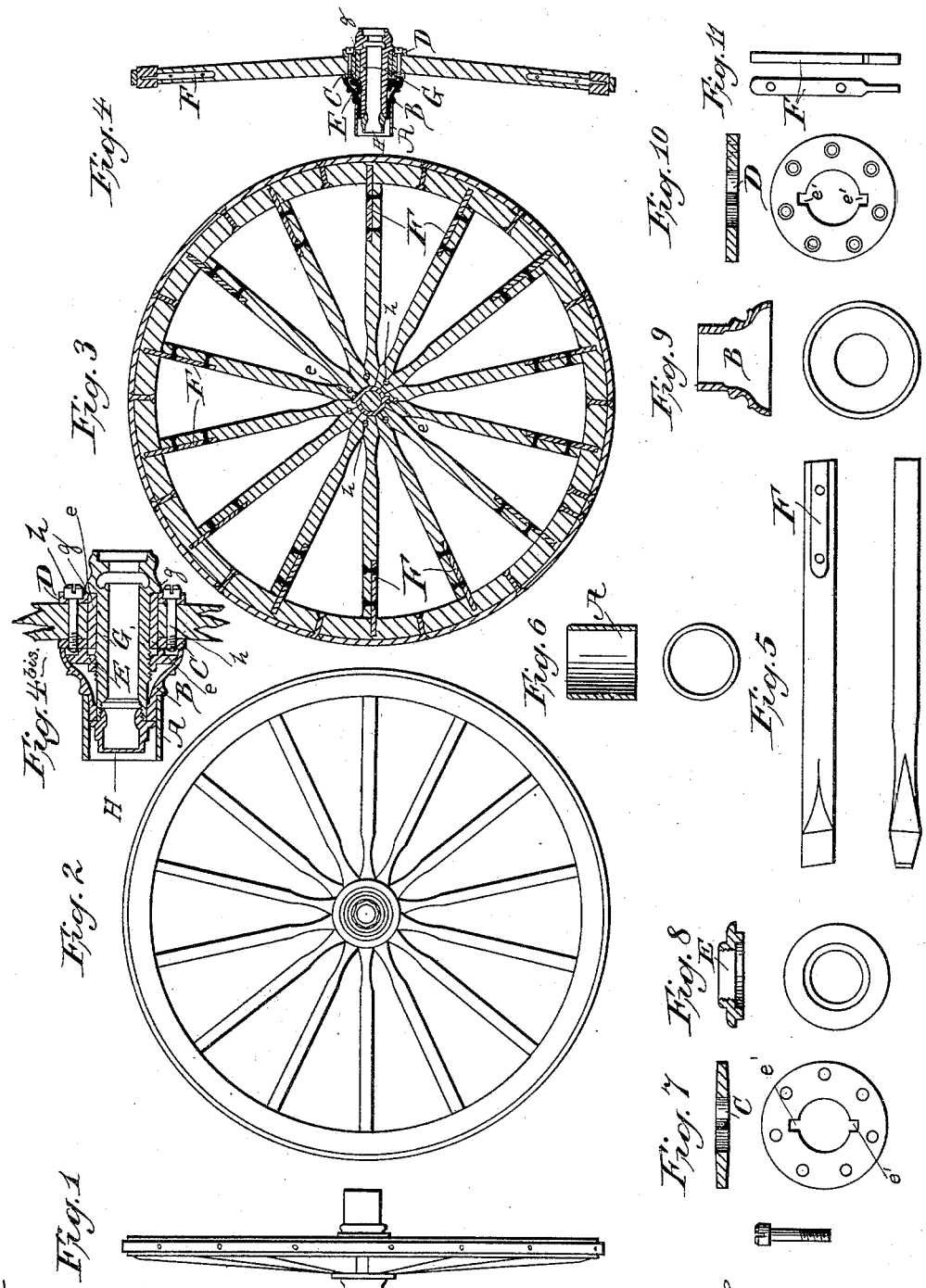

UNITED STATES PATENT OFFICE.

EMILIO BATLLE, OF BARCELONA, SPAIN.

VEHICLE-WHEEL.

SPECIFICATION forming part of Letters Patent No. 411,489, dated September 24, 1889.

Application filed April 19, 1888. Serial No. 271,199. (No model.) Patented in Spain March 1, 1887, No. 6,744.

*To all whom it may concern:*

Be it known that I, EMILIO BATLLE, a subject of the King of Spain, residing at Barcelona, in Spain, have invented certain new and useful Improvements in Vehicle-Wheels, of which the following is a specification, and for which I have received a Spanish patent dated March 1, 1887, No. 6,744.

The present invention relates to improvements in wheels, which may be used for carriages as well as for vans and other vehicles. These improvements increase the stability of the wheels, while they also reduce the cost of manufacture.

In the accompanying drawings, Figure 1 represents an end view of the improved wheel; Fig. 2, a front elevation of the same. Fig. 3 is a vertical section of Fig. 2. Fig. 4 is a cross-section of the wheel. Fig. 4$^{bis}$ is a cross-section of the hub on a larger scale. Fig. 5 is a detail of one of the spokes. Fig. 6 is the cap of the hub. Fig. 7 is the front plate of the hub. Fig. 8 is the nut for fixing the axle-box. Fig. 9 is the hub proper. Fig. 10 is the back plate. Fig. 11 is the key for fixing the spokes to the rim of the wheel.

The axle-box G is provided with the annular shoulder $g$ at the rear end and screw-threaded section at the forward end, on which screws the nut E. Two annular disks C D surround the axle-box between the shoulder $g$ and nut E, said disks being prevented from independent rotation by means of the keys $e$ $e$ entering seats $e'$ $e'$ therein and preferably secured to or forming part of the axle-box, as shown clearly in Fig. 3, and between these disks the inner ends of the spokes are secured. The spokes at the inner ends are not tenoned, but are simply tapered, as shown in Fig. 5, bolts $h$ being passed through apertures between them and through the disks C D, serving to draw the whole together and lock the spokes securely against all lateral movement. Surrounding the nut E and axle-box on the outer side of the hub and resting against the outer edge of the disk C is a casing B, having the sand ring or cap A thereon, and preferably held in place by the nut H, screwing in the end of the axle-box. It will be observed that the annular nut E has a projecting flange which engages the disk C outside of the keys, and that the disk D abuts against the shoulder $g$ on the axle-box, thus enabling the spokes and disks, which form a practically solid element, to be clamped tightly onto the axle-box. This construction also permits the spokes to be set up and the wheel formed without the necessity of having the axle-box first in position, and further enables the axle-box to be removed and renewed without the necessity of releasing the spokes at all. The spokes can be of any suitable number, according to the diameter and the proposed use of the wheel, and are not fastened to the rim by means of tenons. The rim of the wheel is preferably constructed of a single piece of bent wood, but, according to the size of the wheel, may be composed of two or more fellies.

To prepare the rim the wood must be previously steamed to give it the necessary flexibility to bend it without breakage in a suitable bending-press. After the rim is fitted against the spokes a hole is bored into the rim against every spoke, and, a key-bed being formed in the spokes, an iron key F is introduced and fastened to the spoke by means of countersunk screws, which are afterward riveted on the other side of the spokes.

The tire is applied hot, as usual, and may be fastened to the rim by means of countersunk screws, as represented in Fig. 3. When the rim consists of several fellies, these are preferably joined by iron sleeves screwed to the inner circumference of the rim.

I claim—

In a vehicle-wheel, the combination, with the tenonless spokes and the felly having the sockets therein, of the substantially straight keys, arranged on only one of the sides of the spokes and bolted thereto, having the extended ends entering the sockets in the felly, substantially as described.

In testimony whereof I affix my signature in presence of two witnesses.

EMILIO BATLLE.

Witnesses:
JOSÉ MURO,
JOSÉ DAFFARI.